(12) United States Patent
Wei et al.

(10) Patent No.: US 11,208,990 B2
(45) Date of Patent: Dec. 28, 2021

(54) PUMP BODY ASSEMBLY, FLUID MACHINERY, AND HEAT EXCHANGE DEVICE

(71) Applicant: GREE ELECTRIC APPLIANCES, INC. OF ZHUHAI, Guangdong (CN)

(72) Inventors: Huijun Wei, Zhuhai (CN); Jia Xu, Zhuhai (CN); Zhongcheng Du, Zhuhai (CN); Sen Yang, Zhuhai (CN); Zhi Li, Zhuhai (CN); Shebing Liang, Zhuhai (CN); Liping Ren, Zhuhai (CN); Rongting Zhang, Zhuhai (CN); Zhengliang Shi, Zhuhai (CN); Xixing Liu, Zhuhai (CN)

(73) Assignee: GREE ELECTRIC APPLIANCES, INC. OF ZHUHAI, Guangdong (CN)

( * ) Notice: Subject to any disclaimer, the term of this patent is extended or adjusted under 35 U.S.C. 154(b) by 0 days.

(21) Appl. No.: 17/059,119

(22) PCT Filed: Dec. 13, 2018

(86) PCT No.: PCT/CN2018/120954
§ 371 (c)(1),
(2) Date: Nov. 25, 2020

(87) PCT Pub. No.: WO2020/015290
PCT Pub. Date: Jan. 23, 2020

(65) Prior Publication Data
US 2021/0207590 A1    Jul. 8, 2021

(30) Foreign Application Priority Data
Jul. 18, 2018  (CN) .......................... 201810792303.X

(51) Int. Cl.
*F04B 19/22*  (2006.01)
*F16J 1/00*  (2006.01)
(Continued)

(52) U.S. Cl.
CPC .............. *F04B 19/22* (2013.01); *F16J 1/005* (2013.01); *F16J 9/12* (2013.01)

(58) Field of Classification Search
CPC .... F02B 19/22; F16J 1/005; F16J 9/02; F01C 1/344; F04C 18/344; F04C 18/00;
(Continued)

(56) References Cited

U.S. PATENT DOCUMENTS 4,773,654 A * 9/1988 Fritsch .................. F16J 15/363
  277/348
8,257,070 B2 * 9/2012 Maruo ................ F04C 15/0003
  418/132
(Continued)

FOREIGN PATENT DOCUMENTS

CN     202510226 U     10/2012
CN     105604937 A  *  5/2016  ............ F04C 18/344
(Continued)

OTHER PUBLICATIONS

Extended European Search Report for European Application No. 18926384.1 dated Dec. 17, 2020 (8 Pages).
(Continued)

*Primary Examiner* — Grant Moubry
(74) *Attorney, Agent, or Firm* — Brandon V. Zuniga; James R. Gourley; Carstens & Cahoon, LLP

(57) ABSTRACT

A pump assembly, fluid machinery, and a heat exchange device. The pump assembly includes: a lower flange; a lower friction-reducing ring; a cylinder, the lower friction-reducing ring being disposed inside the cylinder, and the lower flange being disposed below the cylinder; and a piston assembly arranged inside the cylinder and includes a piston sleeve and a piston slidably arranged inside the piston sleeve. The lower friction-reducing ring has a central hole. A position-limiting protrusion is disposed on a surface of the
(Continued)

piston sleeve, which faces the lower flange. The limiting protrusion extends into the central hole of the lower friction-reducing ring, fits and is limited by the lower flange.

20 Claims, 18 Drawing Sheets

(51) Int. Cl.
   *F16J 9/02* (2006.01)
   *F16J 9/12* (2006.01)
(58) Field of Classification Search
   CPC ................ F04C 29/00; F04C 2230/603; F04C 2240/10; F04C 2240/20; F04C 2240/60; F04C 2240/80
   See application file for complete search history.

(56) References Cited

U.S. PATENT DOCUMENTS 10,946,851 B2 *  3/2021  Gaertner ................. F04B 53/16

2012/0216673 A1 *  8/2012  Chang ................. F16J 15/3272
   92/165 R

FOREIGN PATENT DOCUMENTS

| CN | 105604937 A | 5/2016 |
| CN | 106870361 A | 6/2017 |
| CN | 108799104 A | 11/2018 |
| CN | 108799105 A | 11/2018 |
| CN | 108799106 A | 11/2018 |
| CN | 108799107 A | 11/2018 |
| CN | 108799108 A | 11/2018 |
| CN | 108869278 A | 11/2018 |
| CN | 108869279 A | 11/2018 |
| DE | 10217228 C1 | 10/2003 |
| JP | S59155580 A | 9/1984 |

OTHER PUBLICATIONS

International Search Report for Application No. PCT/CN2018/120954 dated Feb. 27, 2019 (3 pages).

* cited by examiner

PUMP BODY ASSEMBLY, FLUID MACHINERY, AND HEAT EXCHANGE DEVICE

CROSS REFERENCE TO RELATED APPLICATIONS

This application claims all benefits accruing under 35 U.S.C. § 119 from China Patent Application No. 201810792303.X, filed on Jul. 18, 2018 in the China National Intellectual Property Administration, the entire content of which is hereby incorporated by reference. This application is a national phase under 35 U.S.C. § 120 of international patent application PCT/CN2018/120954, entitled "PUMP BODY ASSEMBLY, FLUID MACHINERY, AND HEAT EXCHANGE DEVICE" filed on Dec. 13, 2018, and published as WO 2020/015290 on Jan. 23, 2020, the content of which is also hereby incorporated by reference. Every patent application and publication listed in this paragraph is hereby incorporated by reference in its entirety.

TECHNICAL FIELD

The present disclosure relates to a field of pump body assembly, and more particularly, to a pump body assembly, fluid machinery, and a heat exchange device.

BACKGROUND

At present, during the operation of the pump body assembly, the piston sleeve is prone to rotate eccentrically and aslant, which causes friction between the piston sleeve, the cylinder, and the piston, thus seriously affecting work efficiency and performance of the pump body assembly.

SUMMARY

The present disclosure provides a pump body assembly, fluid machinery, and a heat exchange device, to solve the problem known to the inventors that the work efficiency of the pump body assembly is affected because the piston sleeve of the pump body assembly is prone to rotate eccentrically.

According to one aspect of the present disclosure, a pump body assembly is provided and includes: a lower flange; a lower friction-reducing ring; a cylinder, the lower friction-reducing ring being disposed inside the cylinder, and the lower flange is disposed below the cylinder; a piston assembly arranged inside the cylinder. The piston assembly includes a piston sleeve and a piston slidably arranged inside the piston sleeve; the lower friction-reducing ring has a central hole; a position-limiting protrusion is disposed on a surface of the piston sleeve, and the surface of the piston sleeve faces the lower flange; and the position-limiting protrusion extends into the central hole of the lower friction-reducing ring, fits and is limited by the lower flange, to prevent the piston sleeve from moving in a radial direction relative to the lower flange.

In some embodiments, a second position-limiting groove is disposed on a surface of the lower flange, and the surface of the lower flange faces the piston sleeve; and the position-limiting protrusion extends into the second position-limiting groove, to prevent the piston sleeve from moving relative to the lower flange in the radial direction.

In some embodiments, a second extended part is provided on a surface of the lower flange, and the surface of the lower flange faces the piston sleeve; and the second extended part limits and stops the position-limiting protrusion, to prevent the piston sleeve 40 from moving relative to the lower flange in the radial direction.

In some embodiments, the second extended part is disposed outside the position-limiting protrusion.

In some embodiments, the second extended part is disposed inside the position-limiting protrusion.

In some embodiments, the position-limiting protrusion is a protruding ring extending towards the lower flange, and the protruding ring and the piston sleeve are coaxially arranged.

In some embodiments, the position-limiting protrusion includes a plurality of protruding platforms extending towards the lower flange, and the plurality of the protruding platforms are arranged at intervals along a circumference of the piston sleeve.

In some embodiments, the pump body assembly further includes an upper flange and an upper friction-reducing ring; the upper friction-reducing ring is disposed inside the cylinder; the upper flange is disposed above the cylinder; and an upper end surface of the piston sleeve fits and is limited by the upper friction-reducing ring, so as to prevent the piston sleeve from moving relative to the upper flange in the radial direction.

In some embodiments, a first extended part is provided on the upper end surface of the piston sleeve, and the first extended part extends into a central hole of the upper friction-reducing ring, fits and is limited by an inner surface of the central hole of the upper friction-reducing ring.

In some embodiments, a fifth position-limiting groove is disposed on a surface of the upper friction-reducing ring, and the surface of the upper friction-reducing ring faces the piston sleeve; a first extended part is provided on the upper end surface of the piston sleeve; and the first extended part extends into the fifth position-limiting groove, and is limited and stopped by the fifth position-limiting groove.

In some embodiments, a fourth extended part is disposed on a surface of the upper friction-reducing ring, and the surface of the upper friction-reducing ring faces the piston sleeve; the fourth extended part extends into the piston sleeve, limits and stops an inner surface of the piston sleeve.

In some embodiments, a fourth extended part is disposed on a surface of the upper friction-reducing ring, and the surface of the upper friction-reducing ring faces the piston sleeve; a first position-limiting groove is disposed on the upper end surface of the piston sleeve; the fourth extended part extends into the first position-limiting groove, limits and stops the first position-limiting groove.

In some embodiments, the pump body assembly further includes an upper flange and an upper friction-reducing ring; the upper friction-reducing ring is disposed inside the cylinder; the upper flange is disposed above the cylinder; the upper friction-reducing ring has a central hole; a first extended part is disposed on an upper end surface of the piston sleeve; and the first extended part extends into the central hole of the upper friction-reducing ring, fits and is limited by a lower end surface of the upper flange, so as to prevent the piston sleeve from moving relative to the upper flange in the radial direction.

In some embodiments, a concave part is disposed on a surface of the upper flange, and the surface of the upper flange faces the piston sleeve; the first extended part extends into the concave part, and is limited and stopped by the convex part in the radial direction of the piston sleeve.

In some embodiments, the lower end surface of the upper flange has a position-limiting portion extending towards the piston sleeve; the first extended part is limited and stopped by the position-limiting portion, so as to prevent the piston sleeve from moving relative to the upper flange in the radial direction.

In some embodiments, the pump body assembly further includes an upper flange disposed above the piston assembly, and the pump body assembly further includes a rotation shaft. The rotation shaft is provided, and passes through the upper flange, the piston sleeve, and the lower flange in sequence, and the rotation shaft, the upper flange and the lower flange are coaxially arranged.

According to another aspect of the present disclosure, fluid machinery is provided and includes the pump body assembly above.

According to another aspect of the present disclosure, a heat exchange device is provided and includes the fluid machinery above.

In the technical solution applying these embodiments, the pump body assembly includes the lower flange, the lower friction-reducing ring, the cylinder, and the piston assembly. The lower friction-reducing ring is disposed inside the cylinder; the lower flange is disposed below the cylinder; the piston assembly arranged inside the cylinder. The piston assembly includes the piston sleeve and the piston slidably arranged inside the piston sleeve; the lower friction-reducing ring has the central hole; the position-limiting protrusion is disposed on the surface of the piston sleeve, and the surface of the piston sleeve faces the lower flange; and the position-limiting protrusion extends into the central hole of the lower friction-reducing ring, fits and is limited by the lower flange, so as to prevent the piston sleeve from moving in a radial direction relative to the lower flange. In this case, during the operation of the pump body assembly, the position-limiting protrusion disposed at the lower end of the piston sleeve passes through the central hole of the lower friction-reducing ring, fits and is limited by the lower flange, thus the lower end of the piston sleeve is limited and supported by the lower flange, thereby preventing the piston sleeve from moving in the radial direction during operation, ensuring that the piston sleeve can rotate normally, solving a problem known to the investors that work efficiency of the pump body assembly is affected because the piston sleeve of the pump body assembly is prone to rotate eccentrically, and improving operation reliability and work performance of the pump body assembly.

BRIEF DESCRIPTION OF THE DRAWINGS

The accompanying drawings attached to the specification form a part of the present disclosure and are intended to provide a further understanding of the present disclosure. The illustrative embodiments of the present disclosure and the description thereof are used for explanations of the present disclosure, and do not constitute improper limitations of the present disclosure. In the accompanying drawings.

DETAILED DESCRIPTION OF THE EMBODIMENTS

Figure 1:
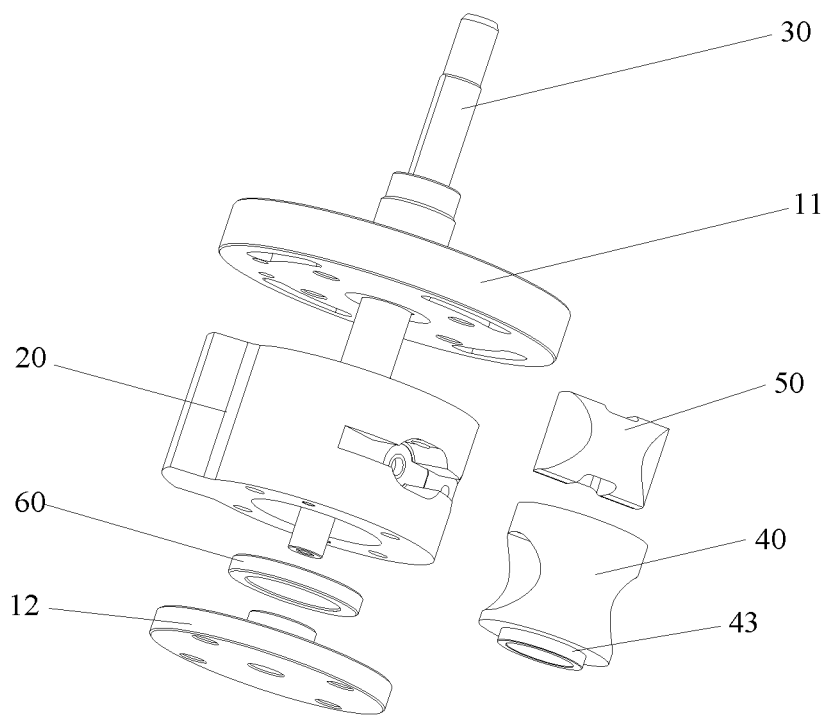
FIG. 1 shows a schematic exploded view of a pump body assembly according to a first embodiment of the present disclosure.

It should be noted that the embodiments in the present disclosure and the features in the embodiments can be combined with each other if no conflicts occur. The present disclosure will be described in detail below with reference to the accompanying drawings in combination with the embodiments.

It should be noted that, unless otherwise indicated, all technical and scientific terms used herein have the same meanings as commonly understood by the ordinary skilled in the art of the present disclosure.

In the present disclosure, unless stated to the contrary, the orientation words such as "up", and "down" are usually used to refer to the orientations shown in the drawings, or to the component itself in the vertical, orthographic or gravity direction. Similarly, in order to facilitate the understanding and the description, the orientation words such as "left", and "right" are usually used to refer to the left and right shown in the drawings, and the orientation words such as "inner", and "outer" refer to inner and outer relative to the outline of each component itself. However, the above-mentioned orientation words are not given to limit the present disclosure.

In order to solve the problem known to the inventors that the work efficiency of the pump body assembly is affected because the piston sleeve of the pump body assembly is prone to rotate eccentrically, the present disclosure provides a pump body assembly, fluid machinery, and a heat exchange device.

First Embodiment

As shown in FIGS. 1 to 4, the pump body assembly includes a lower flange 12, a lower friction-reducing ring 60, a cylinder 20, and a piston assembly. Where the lower friction-reducing ring 60 is disposed inside the cylinder 20, and the lower flange 12 is disposed below the cylinder 20. The piston assembly is arranged inside the cylinder 20. The piston assembly includes a piston sleeve 40, and a piston 50 slidably arranged inside the piston sleeve 40. The lower friction-reducing ring 60 has a central hole. A position-limiting protrusion 43 is disposed on a surface of the piston sleeve 40, which faces the lower flange 12. The position-limiting protrusion 43 extends into the central hole of the lower friction-reducing ring 60, fits and is limited by the lower flange 12, so as to prevent the piston sleeve 40 from moving in a radial direction relative to the lower flange 12.

In the technical solution applying this embodiment, during the operation of the pump body assembly, the position-limiting protrusion 43 disposed at a lower end of the piston sleeve 40 passes through the central hole of the lower friction-reducing ring 60, fits and is limited by the lower flange 12, thus the lower end of the piston sleeve 40 is limited and supported by the lower flange 12, thereby preventing the piston sleeve 40 from moving in the radial direction during operation, ensuring that the piston sleeve 40 can rotate normally, solving a problem known to the inventors that work efficiency of the pump body assembly is affected because the piston sleeve of the pump body assembly is prone to rotate eccentrically, and improving operation reliability and work performance of the pump body assembly.

Figure 2:
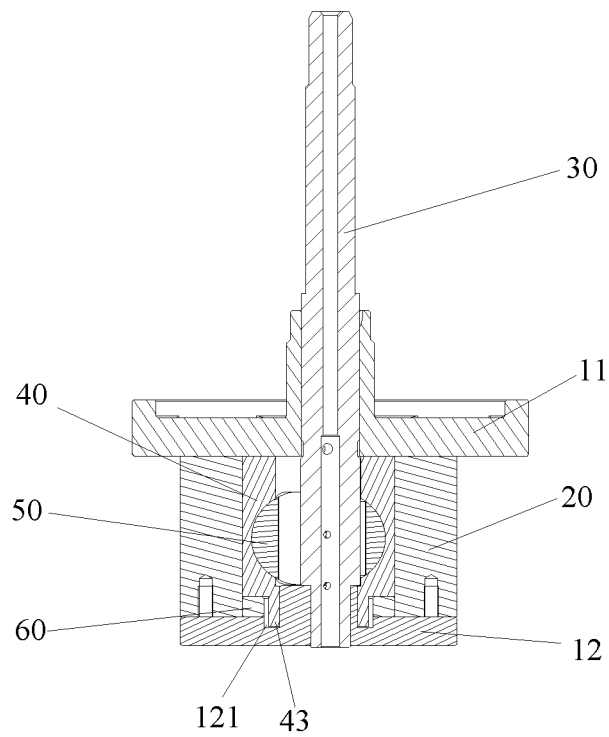
FIG. 2 shows a cross-sectional view of the pump body assembly in FIG. 1.
Figure 3:
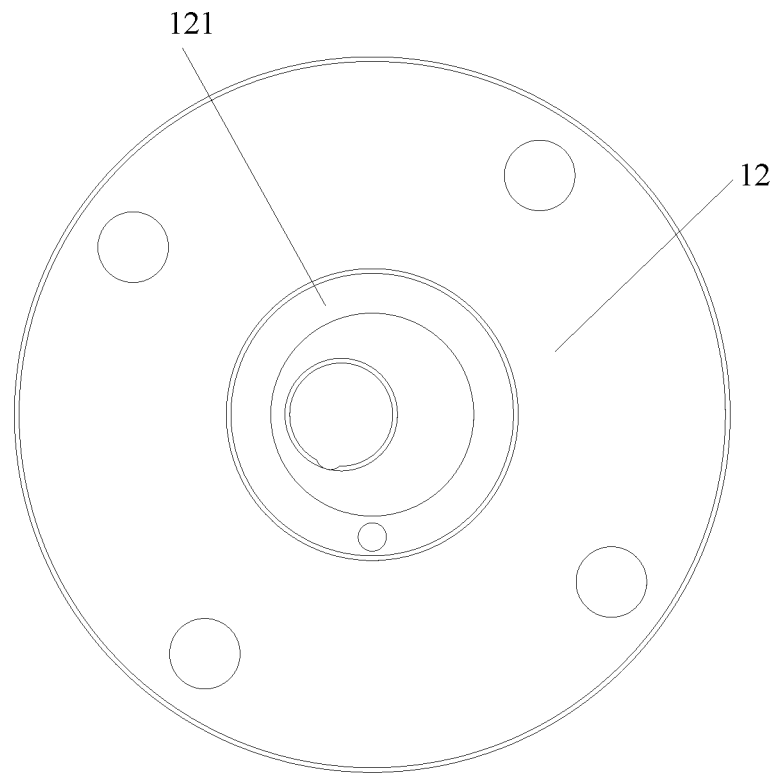
FIG. 3 shows a top view of a lower flange of the pump body assembly in FIG. 1.
Figure 4:
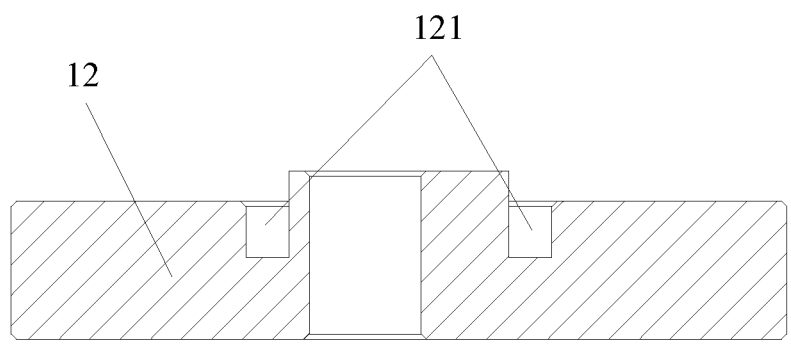
FIG. 4 shows a cross-sectional view of the lower flange in FIG. 3.

As shown in FIGS. 2 and 3, a second position-limiting groove 121 is disposed on a surface of the lower flange 12, which faces the piston sleeve 40. The position-limiting protrusion 43 extends into the second position-limiting groove 121, so as to prevent the piston sleeve 40 from moving relative to the lower flange 12 in the radial direction. In this case, during the operation of the pump body assembly, the position-limiting protrusion 43 disposed on the piston sleeve 40 extends into the second position-limiting groove 121 of the lower flange 12, and a groove wall of the second position-limiting groove 121 limits and stops a surface of the position-limiting protrusion 43, thus realizing, by the lower flange 12, a position limitation and a stop to the lower end of the piston sleeve 40, and preventing the lower end of the piston sleeve 40 from moving relative to the lower flange 12 in the radial direction.

Specifically, the second position-limiting groove 121 is eccentrically arranged on the lower flange 12, and the position-limiting protrusion 43 extends into the second position-limiting groove 121, thus realizing, by the lower flange 12, the position limitation and the stop to the piston sleeve 40.

Optionally, the second position-limiting groove 121 is a ring-shaped groove, and an eccentricity of the ring-shaped groove on the lower flange 12 is e.

As shown in FIG. 1, the pump body assembly further includes an upper flange 11 disposed above the piston assembly, and the pump body assembly further includes a rotation shaft 30. The rotation shaft 30 is provided and passes through the upper flange 11, the piston sleeve 40 and the lower flange 12 in sequence. The rotation shaft 30, the upper flange 11, and the lower flange 12 are coaxially arranged. During the operation of the pump body assembly, the rotation shaft 30 rotates around a central axis of the upper flange 11; the piston sleeve 40 rotates around a central axis of a concave part 111; the piston 50 only reciprocates relative to the piston sleeve 40, and the piston 50 reciprocates relative to the rotation shaft 30. Two reciprocating motions are perpendicular to each other, that is, the operation of the pump body assembly follows a principle of a cross slide block type mechanism. With the reciprocating motion between the piston 50 and the piston sleeve 40, the volumes of two cavities formed among a curved surface of a head of the piston 50, an inner surface of the cylinder 20, and a guiding hole of the piston sleeve 40 gradually changes, completing processes of intake, compression and exhausting.

The present disclosure further provides fluid machinery (not shown), including the above-mentioned pump body assembly. Optionally, the fluid machinery is a compressor.

The present disclosure further provides a heat exchange device (not shown), including the above-mentioned fluid machinery. Optionally, the heat exchange device is an air conditioner.

Second Embodiment

The pump body assembly of the second embodiment differs from that of the first embodiment in that a structure of the lower flange 12 is different.

Figure 5:
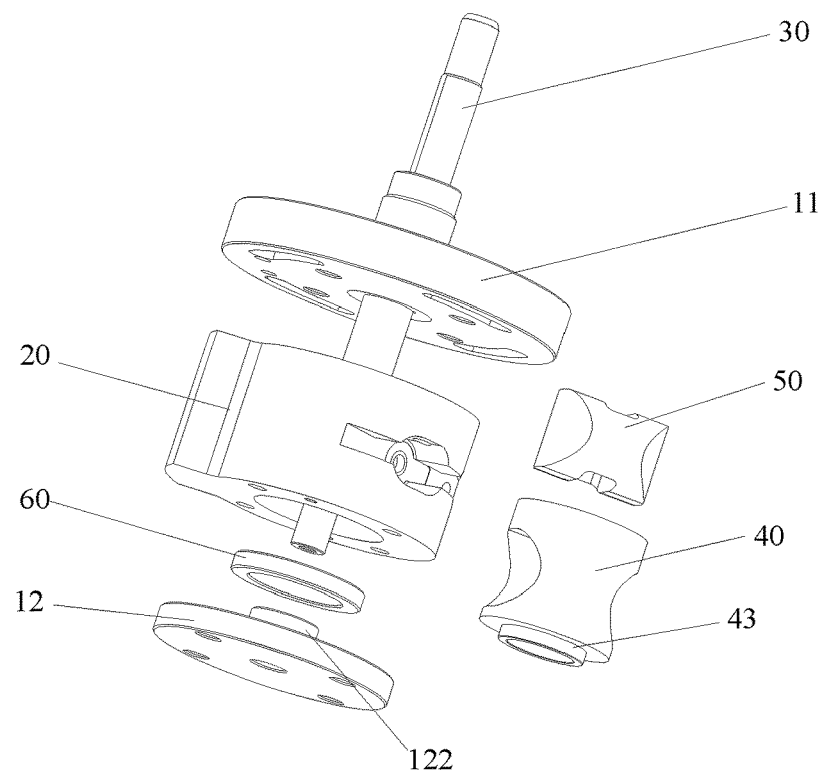
FIG. 5 shows a schematic exploded view of a pump body assembly according to a second embodiment of the present disclosure.
Figure 6:
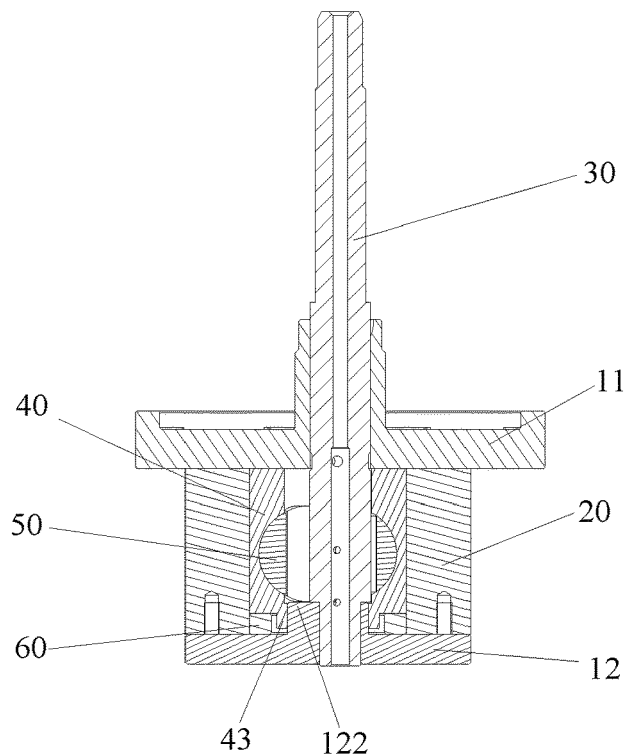
FIG. 6 shows a cross-sectional view of the pump body assembly in FIG. 5.
Figure 7:
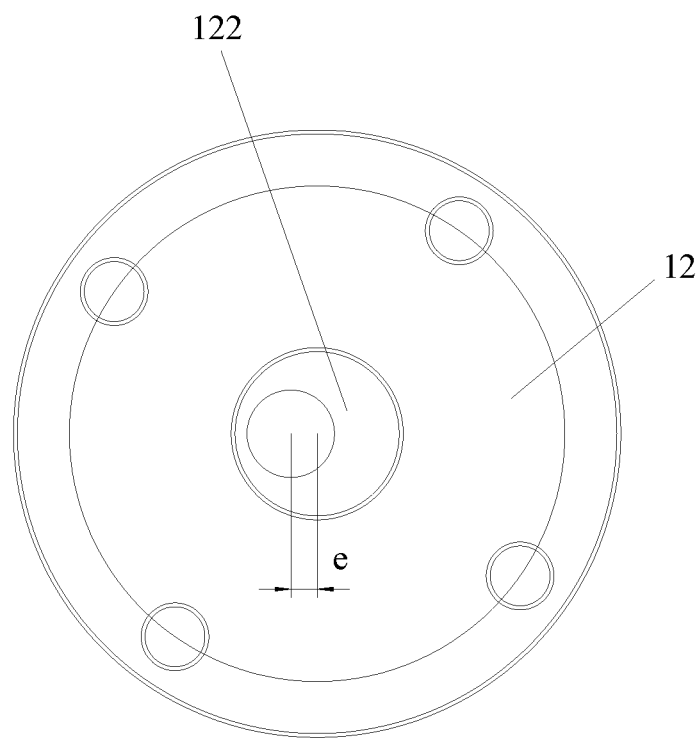
FIG. 7 shows a top view of a lower flange of the pump body assembly in FIG. 5.
Figure 8:
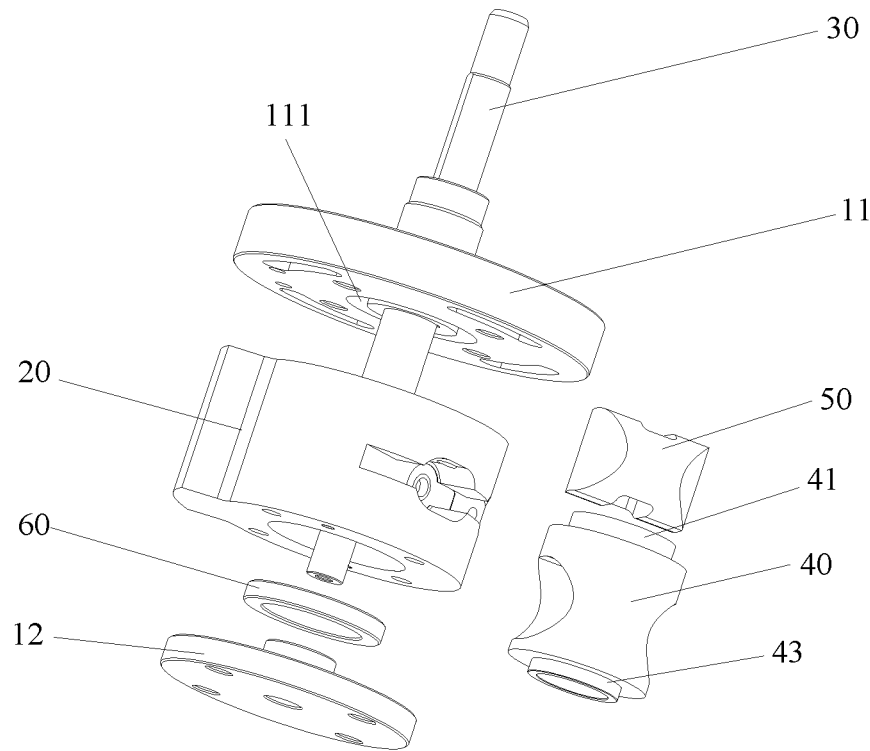
FIG. 8 shows a schematic exploded view of a pump body assembly according to a third embodiment of the present disclosure.
Figure 9:
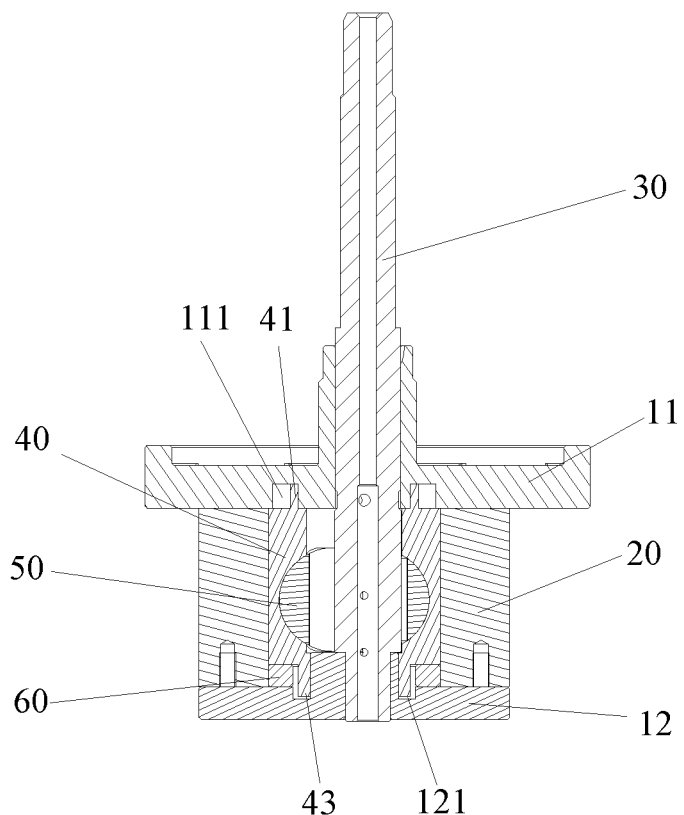
FIG. 9 shows a cross-sectional view of the pump body assembly in FIG. 8.
Figure 10:
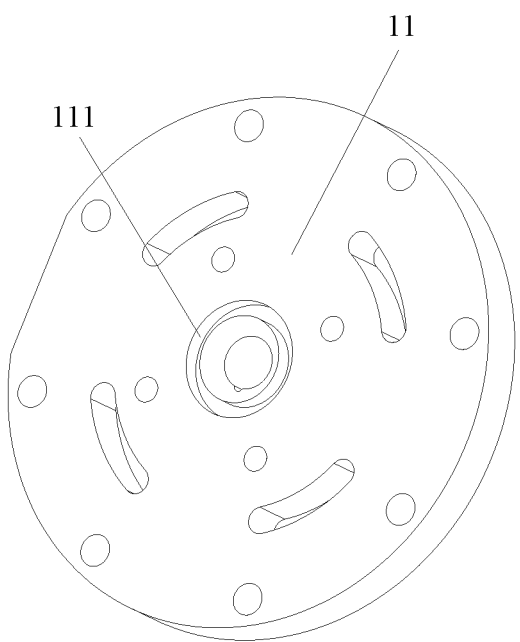
FIG. 10 shows a schematic perspective view of an upper flange of the pump body assembly in FIG. 8.
Figure 11:
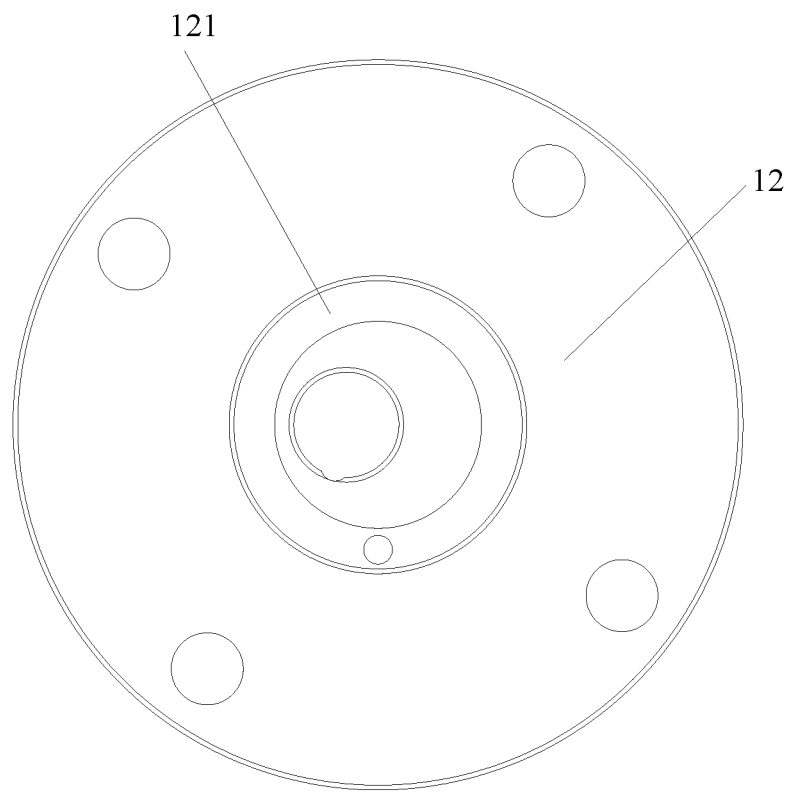
FIG. 11 shows a top view of a lower flange of the pump body assembly in FIG. 8.
Figure 12:
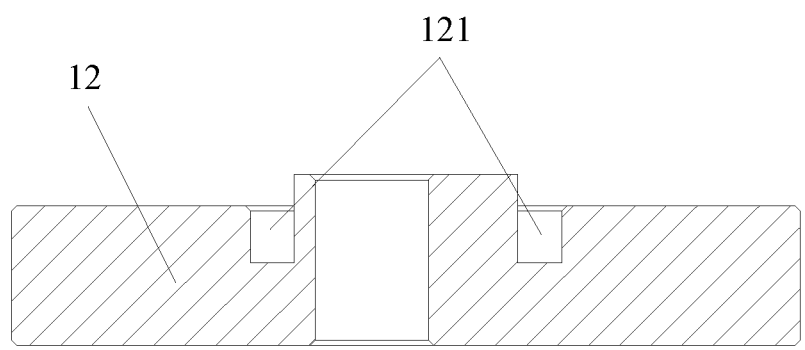
FIG. 12 shows a cross-sectional view of the lower flange in FIG. 11.

As shown in FIGS. 5 to 7, a second extended part 122 is provided on the surface of the lower flange 12, which faces the piston sleeve 40. The second extended part 122 limits and stops the position-limiting protrusion 43, so as to prevent the piston sleeve 40 from moving relative to the lower flange 12 in the radial direction. Specifically, during the operation of the pump body assembly, a side surface of the second extended part 122 fits and limits a side surface of the position-limiting protrusion 43 to avoid a radial displacement therebetween, thereby preventing the piston sleeve 40 from moving relative to the lower flange 12 in the radial direction, ensuring the piston sleeve 40 to operate normally, and improving the operation reliability and the work efficiency of the pump body assembly.

As shown in FIG. 6, the second extended part 122 is disposed inside the position-limiting protrusion 43. Specifically, an outer side surface of the second extended part 122 limits and stops a side surface of the position-limiting protrusion 43, which is proximate to a center of the piston sleeve 40, to prevent a radial displacement therebetween.

Optionally, there is a first predetermined distance between the outer side surface of the second extended part 122 and the side surface of the position-limiting protrusion 43, which is proximate to the center of the piston sleeve 40. The first predetermined distance is greater than or equal to 5 µm, and less than or equal to 40 µm. In this case, the above numerical range not only ensures that the second extended part 122 can limit the position-limiting protrusion 43 in the radial direction, but also enables the position-limiting protrusion 43 to rotate relative to the second extended part 122, thereby improving the operation reliability of the pump body assembly.

In other embodiments not shown in the drawings, the second extended part is located outside the position-limiting protrusion. Specifically, an inner side surface of the second extended part limits and stops a side surface of the position-limiting protrusion, which is far away from the center of the piston sleeve, thereby preventing a radial displacement therebetween.

As shown in FIGS. 5 and 6, the position-limiting protrusion 43 is a protruding ring extending towards the lower flange 12, and the protruding ring and the piston sleeve 40 is coaxially arranged.

It should be noted that the structure of the position-limiting protrusion 43 is not limited to such. Optionally, the position-limiting protrusion 43 includes a plurality of protruding platforms extending towards the lower flange 12, and the plurality of the protruding platforms are arranged at intervals along a circumference of the piston sleeve 40.

Optionally, the second extended part 122 is an eccentric protruding platform, and the eccentricity of the second extended part 122 on the lower flange 12 is e. In this case, the eccentricity of the pump body assembly is determined in the above manner, which makes it easier to guarantee the eccentricity of the pump body assembly, and the determination of the eccentricity e is more reliable and simpler.

Third Embodiment

The pump body assembly of the third embodiment differs from that of the first embodiment in that a structure of the upper flange 11 is different.

As shown in FIGS. 8 to 12, a concave part 111 is provided on a surface of the upper flange 11, which faces the piston sleeve 40. A first extended part 41 extends into the concave part 111, and is limited and stopped by the convex part 111 in the radial direction of the piston sleeve 40. In this case, the first extended part 41 of the piston sleeve 40 extends into the concave part 111 of the upper flange 11, thus realizing, by the upper flange 11, the position limitation to the piston sleeve 40 in the radial direction. During the operation of the pump body assembly, the convex part 111 limits and stops the first extended part 41, which ensures that the first extended part 41 rotates in the convex part 111, thereby preventing the first extended part 41 from moving in the radial direction, realizing, by the upper flange 11, the position limitation to and a support for the upper end of the piston sleeve 40, and preventing the piston sleeve 40 from rotating eccentrically and aslant. Moreover, the lower end of the piston sleeve 40 is limited and supported by the lower flange 12, thereby making both the upper and lower ends of the piston sleeve 40 to be limited and supported, ensuring the pump body assembly to operate normally, and improving the work reliability of the pump body assembly.

In this embodiment, the first extended part 41 and the concave part 111 are ring-shaped, and the first extended part 41, the concave part 111 and the piston sleeve 40 are coaxially arranged. In this case, the above arrangement enables the piston sleeve 40 to rotate relative to the upper flange 11, thereby ensuring the operation reliability of the pump body assembly. The piston sleeve 40 and the upper flange 11 are eccentrically arranged, and an eccentricity therebetween is an eccentricity e of the pump body assembly. In this case, the above arrangement enables the first extended part 41 of the piston sleeve 40 to rotate in the concave part 111 of the upper flange 11 and rotate around a center axis of the piston sleeve 40 (or around a center axis of the concave part 111), thus ensuring reliability of the position limitation and the support provided by the upper flange for the piston sleeve 40.

It should be noted that the structure of the first extended part 41 is not limited to such. Optionally, the first extended part 41 is a double-layered ring-shaped structure, and at least one layer of the ring-shaped structure is limited and stopped by an inner groove wall or an outer groove wall of the concave part 111. In this case, the above arrangement makes the structure of the first extended part 41 more diversified, thereby making the processing and manufacturing of the piston sleeve 40 easier and simpler, and reducing labor intensity of staff.

In this embodiment, the concave part 111 is a groove. The above-mentioned structure is simple, and easy to process and implement.

In this embodiment, a width of the groove is greater than a thickness of the first extended part 41. In this case, the above arrangement ensures that the first extended part 41 is located in the groove, thereby ensuring that the groove can limit and stop the first extended part 41, improving the reliability of the position limitation provided by the upper flange 11 for the piston sleeve 40, and improving the operation reliability of the pump body assembly.

In this embodiment, there is a second predetermined distance between an inner groove wall of the groove and a side surface of the first extended part 41, which is proximate to the center of the piston sleeve 40, and the second predetermined distance is greater than or equal to 5 µm, and less than or equal to 40 µm. Specifically, the inner groove wall of the groove limits and stops the side surface of the first extended part 41, which is proximate to the center of the piston sleeve 40, thus preventing a radial displacement therebetween. Moreover, in order to ensure that the piston sleeve 40 can rotate normally, the second predetermined distance, between the inner groove wall of the groove and the side surface of the first extended part 41 proximate to the center of the piston sleeve 40, is set, which not only ensures the groove to limit the position of the first extended part 41 in the radial direction, but also enables the first extended part 41 to rotate relative to the groove, thereby improving the operation reliability of the pump body assembly.

In this embodiment, the convex part 111 and the upper flange 11 are eccentrically arranged, and the eccentricity is e. In this case, the eccentricity of the pump body assembly is determined in the above manner, making it easier to guarantee the eccentricity of the pump body assembly, and the determination of the eccentricity e is more reliable and simpler.

Fourth Embodiment

The pump body assembly of the fourth embodiment differs from that of the third embodiment in that a structure of the pump body assembly is different.

Figure 13:
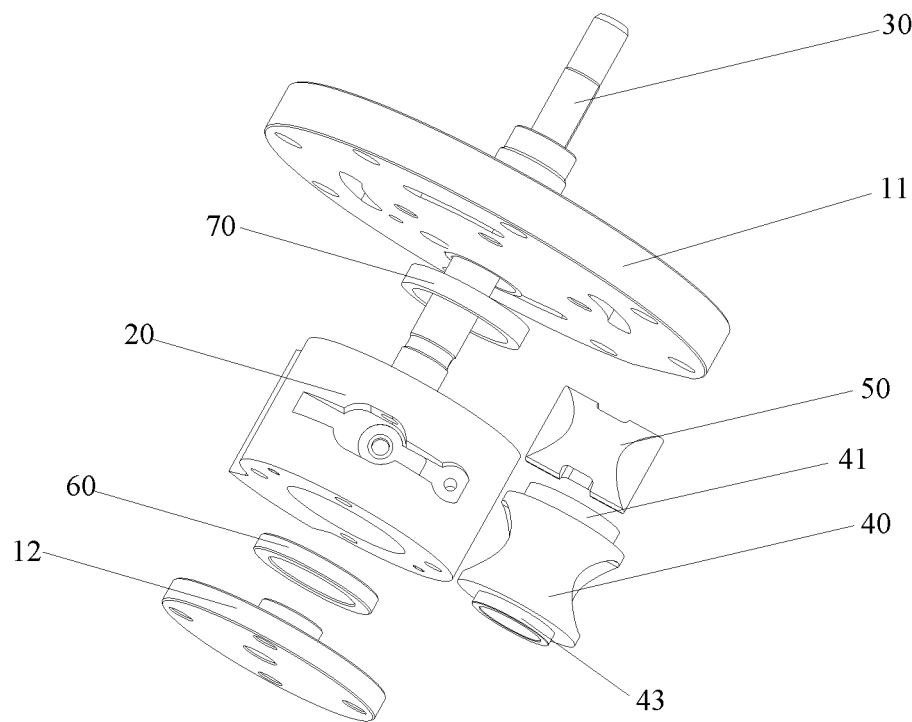
FIG. 13 shows a schematic exploded view of a pump body assembly according to a fourth embodiment of the present disclosure.
Figure 14:
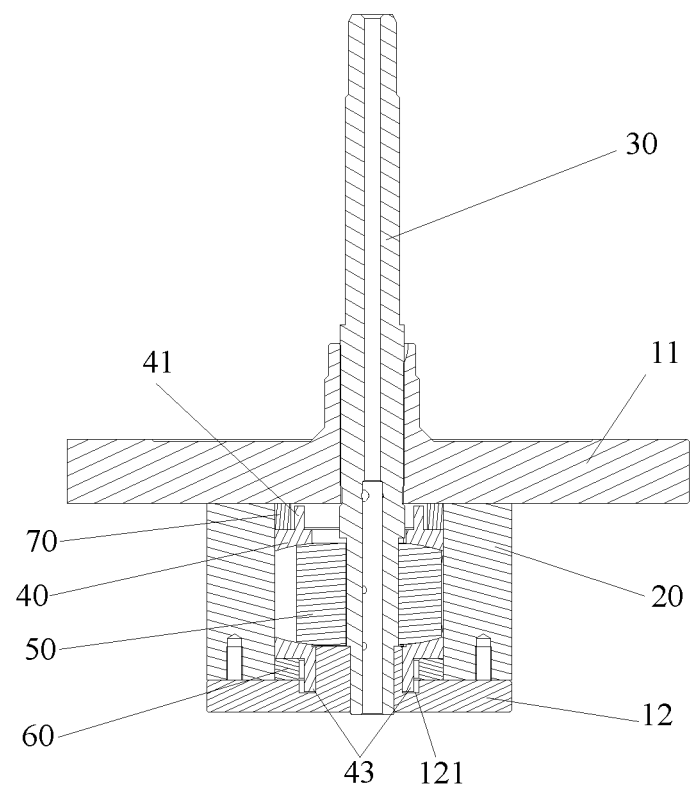
FIG. 14 shows a cross-sectional view of the pump body assembly in FIG. 13.
Figure 15:
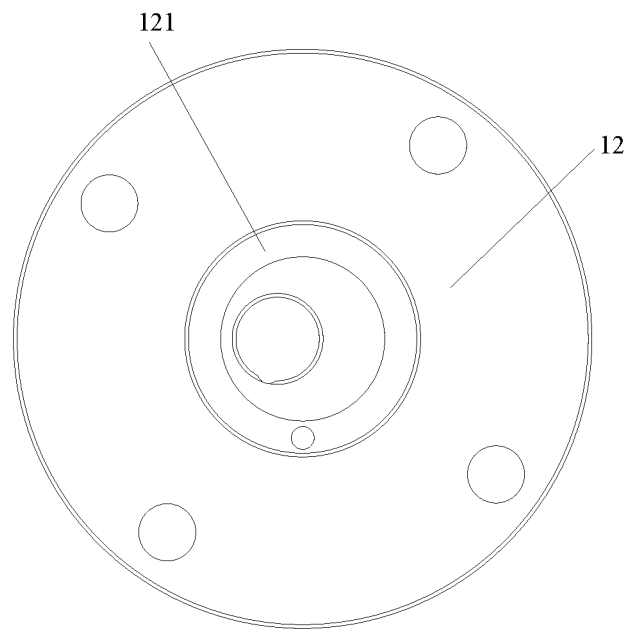
FIG. 15 shows a top view of a lower flange of the pump body assembly in FIG. 13.
Figure 16:
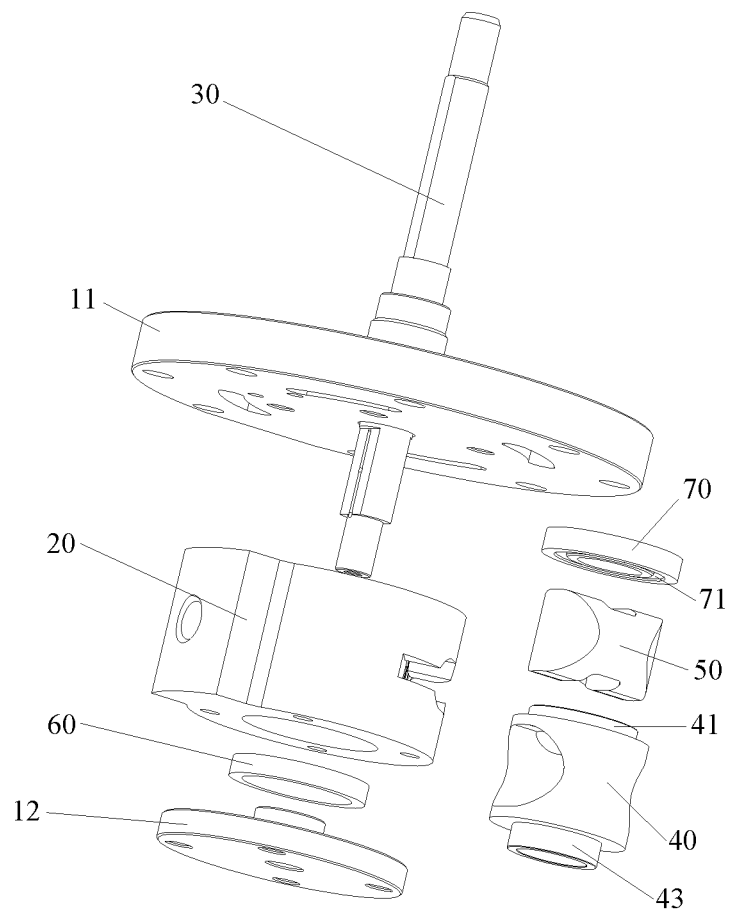
FIG. 16 shows a schematic exploded view of a pump body assembly according to a fifth embodiment of the present disclosure.
Figure 17:
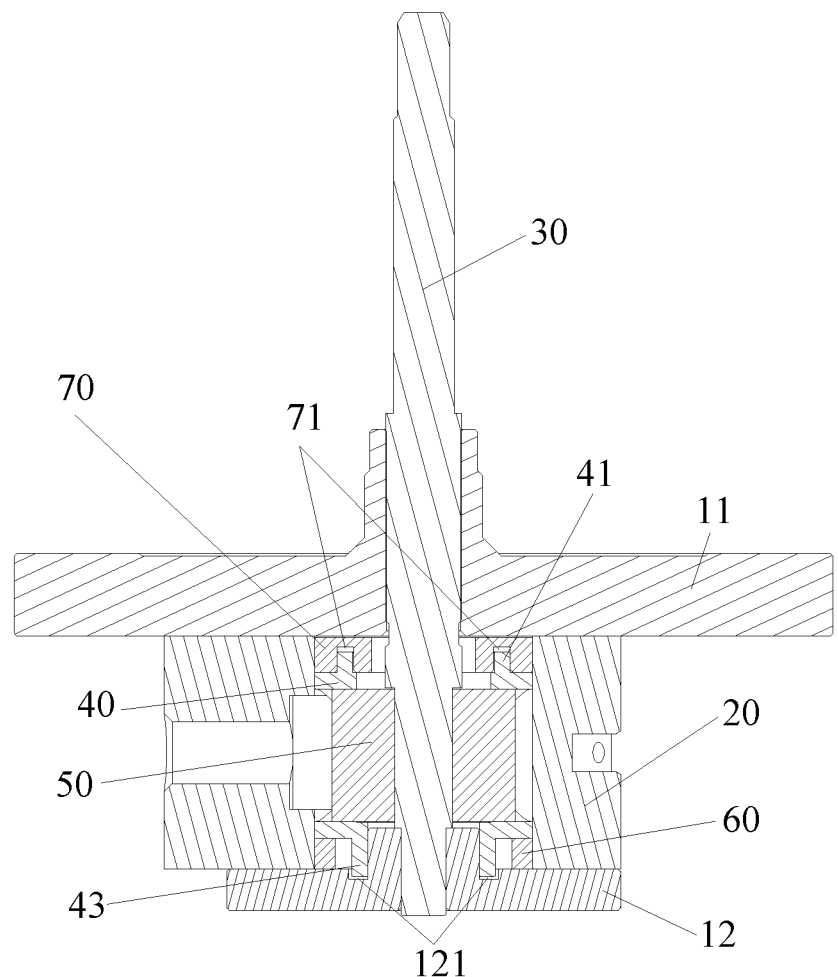
FIG. 17 shows a cross-sectional view of the pump body assembly in FIG. 16.
Figure 18:
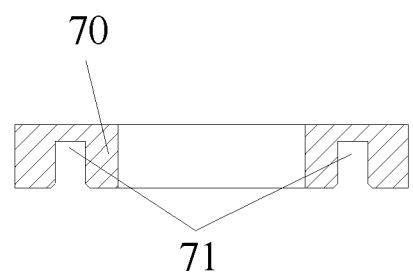
FIG. 18 shows a cross-sectional view of an upper friction-reducing ring of the pump body assembly in FIG. 16.
Figure 19:
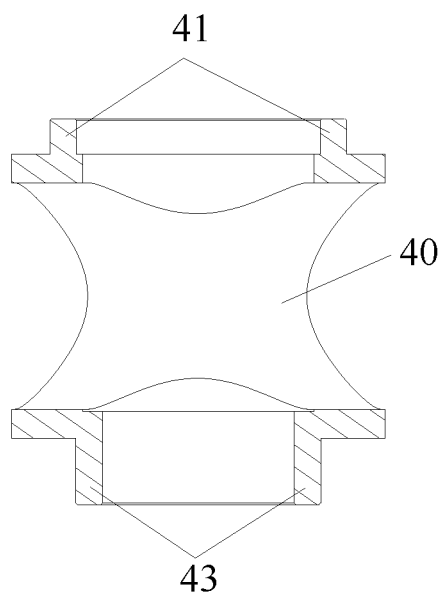
FIG. 19 shows a cross-sectional view of a piston sleeve of the pump body assembly in FIG. 16.
Figure 20:
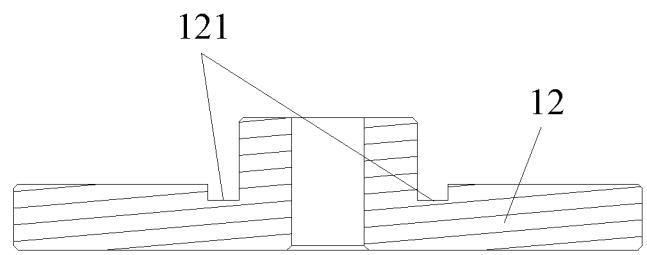
FIG. 20 shows a cross-sectional view of a lower flange of the pump body assembly in FIG. 16.
Figure 21:
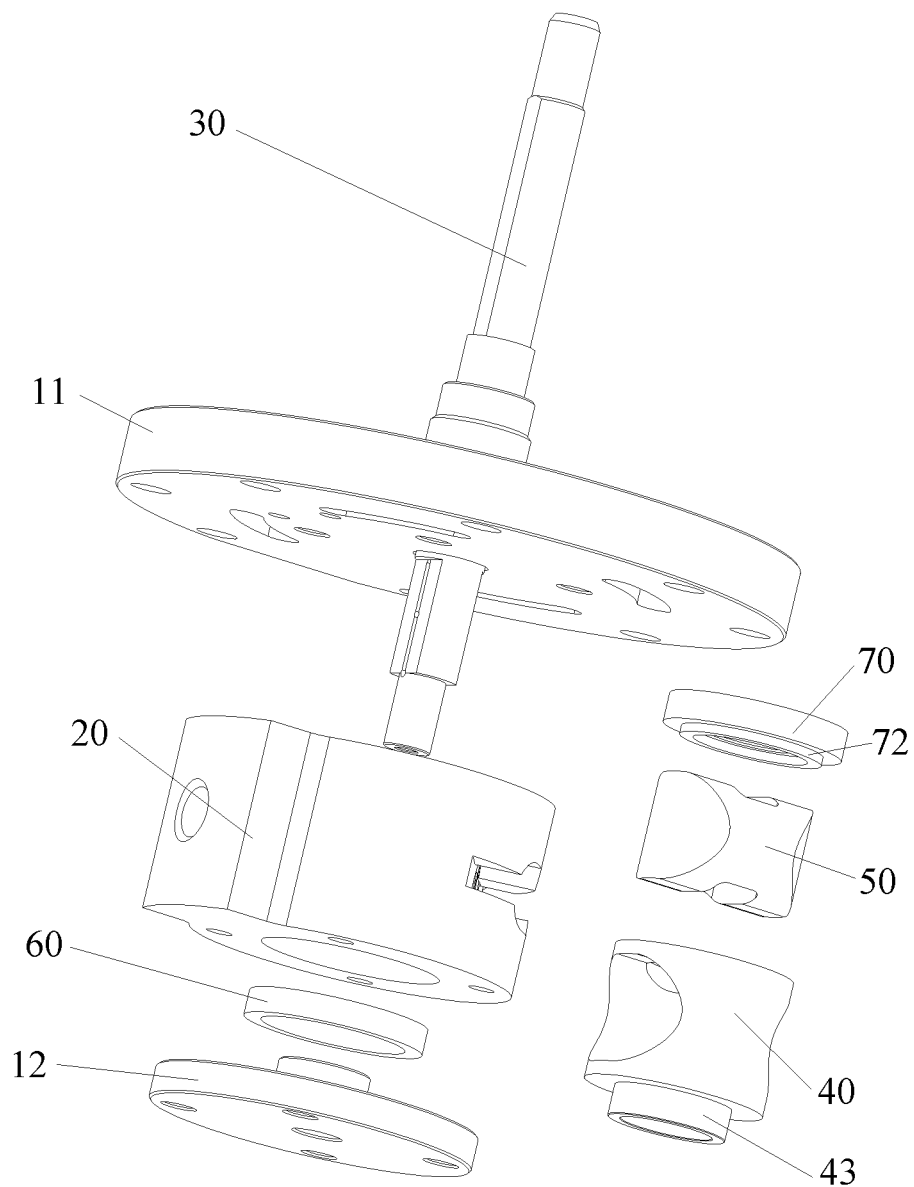
FIG. 21 shows a schematic exploded view of a pump body assembly according to a sixth embodiment of the present disclosure.
Figure 22:
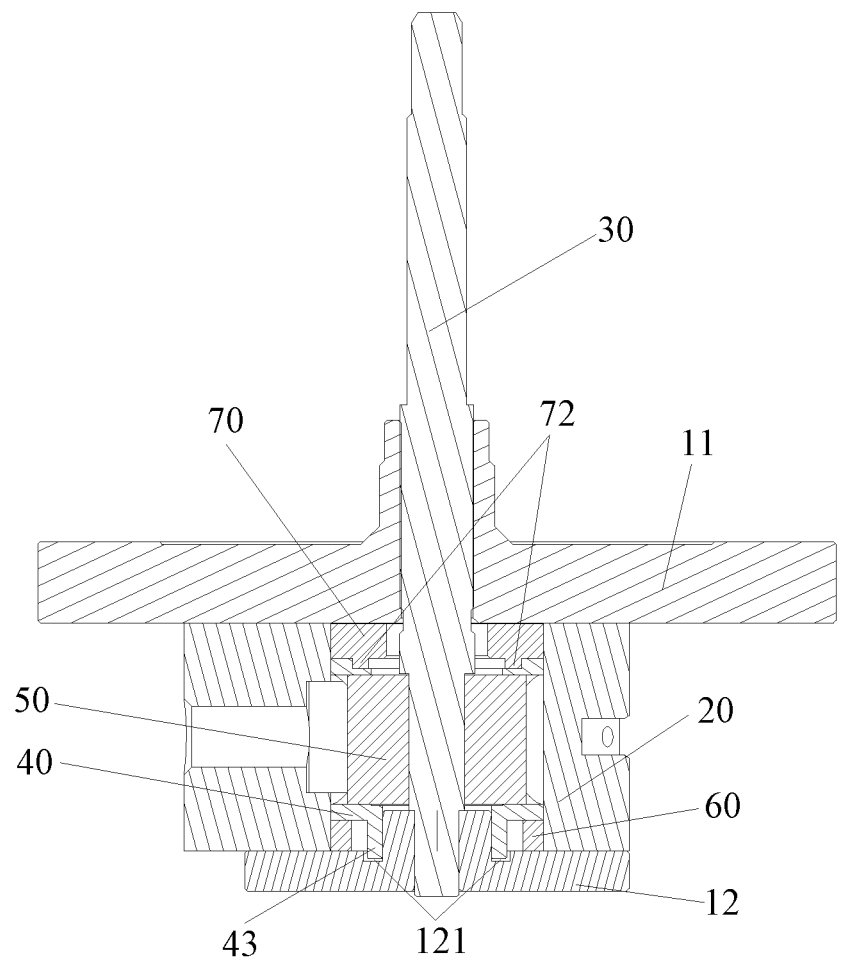
FIG. 22 shows a cross-sectional view of the pump body assembly in FIG. 21.
Figure 23:
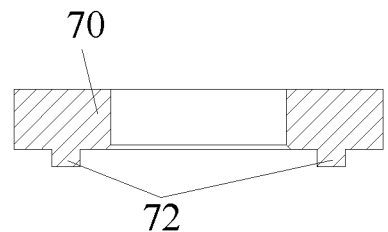
FIG. 23 shows a cross-sectional view of an upper friction-reducing ring of the pump body assembly in FIG. 21.
Figure 24:
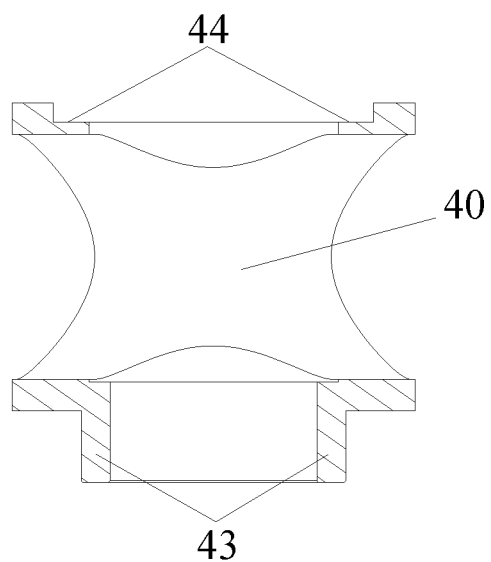
FIG. 24 shows a cross-sectional view of a piston sleeve of the pump body assembly in FIG. 21.
Figure 25:
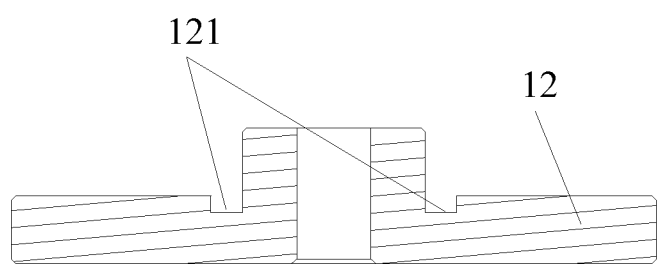
FIG. 25 shows a cross-sectional view of a lower flange of the pump body assembly in FIG. 21.
Figure 26:
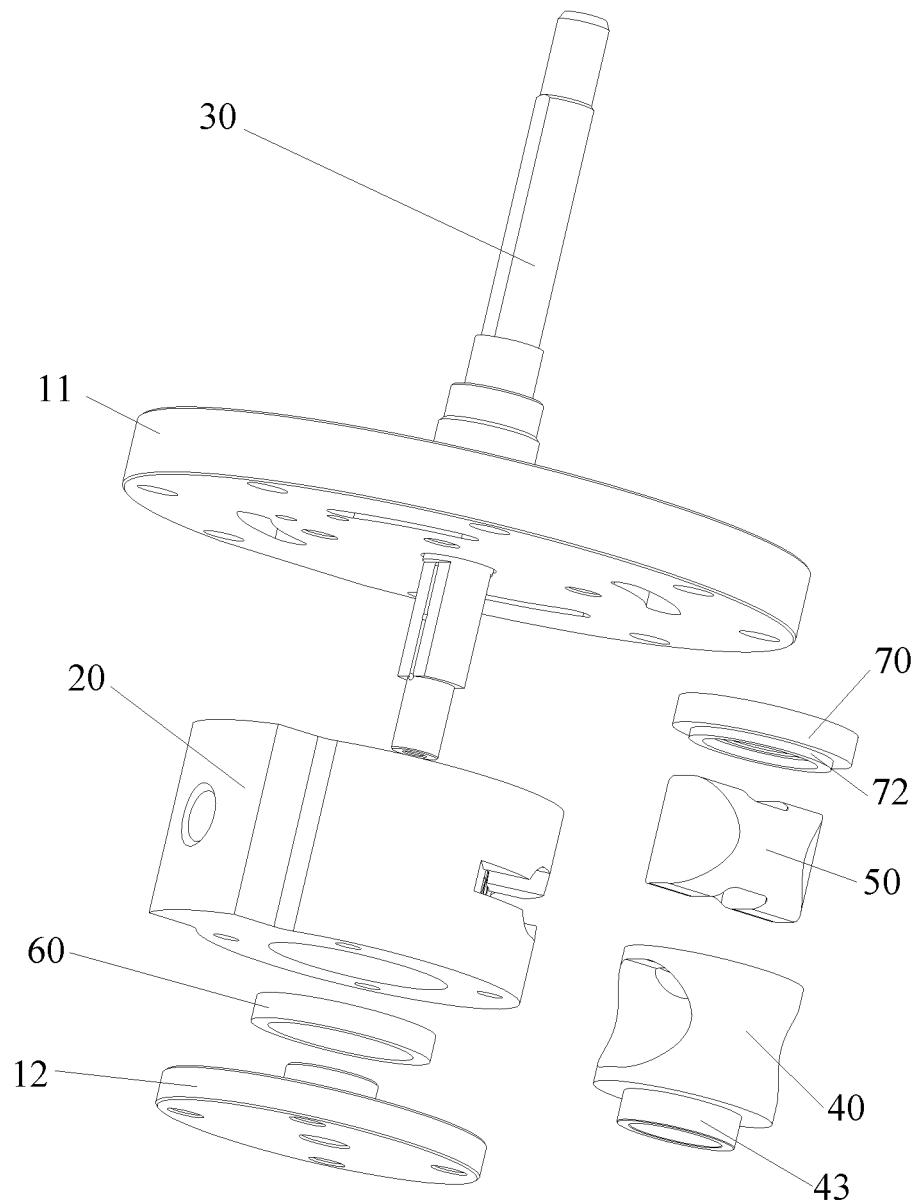
FIG. 26 shows a schematic exploded view of a pump body assembly according to a seventh embodiment of the present disclosure.
Figure 27:
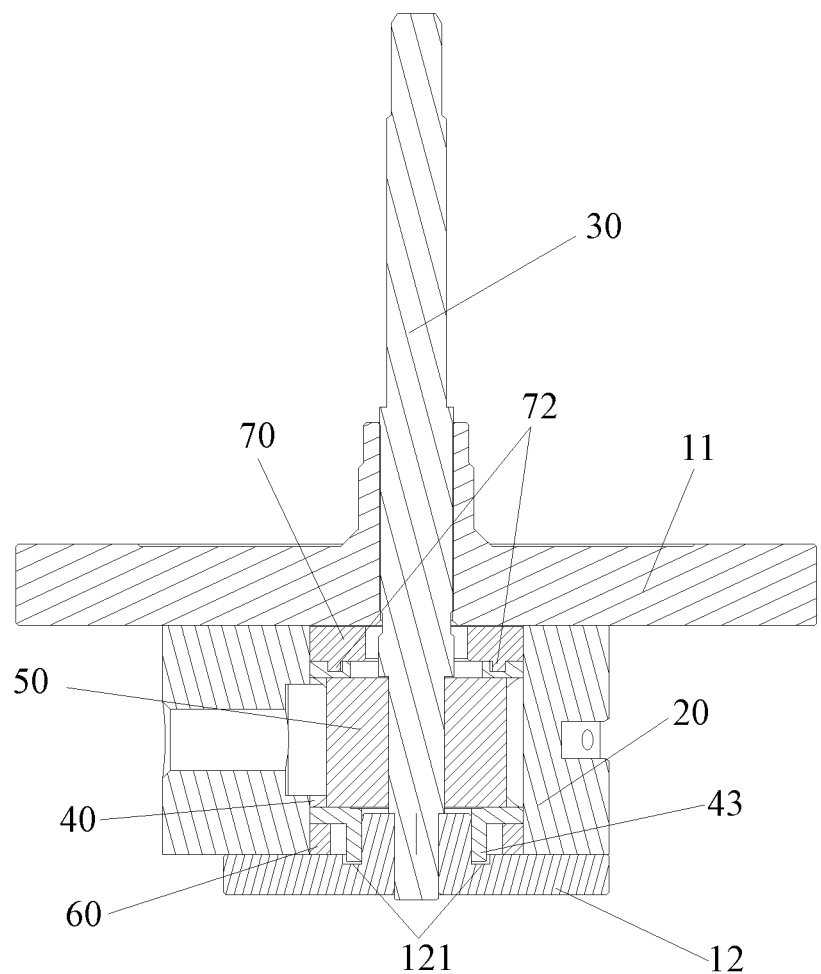
FIG. 27 shows a cross-sectional view of the pump body assembly in FIG. 26.
Figure 28:
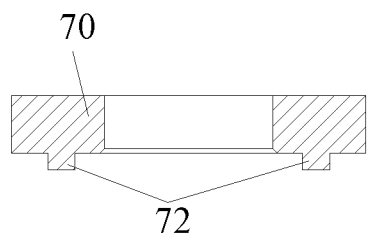
FIG. 28 shows a cross-sectional view of an upper friction-reducing ring of the pump body assembly in FIG. 26.
Figure 29:
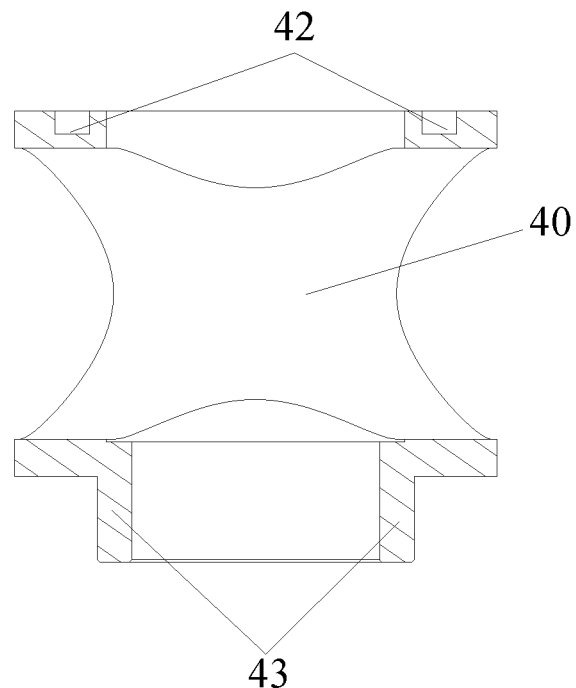
FIG. 29 shows a cross-sectional view of a piston sleeve of the pump body assembly in FIG. 26.
Figure 30:
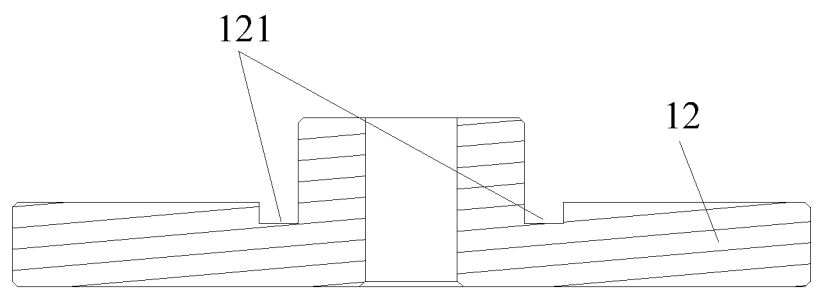
FIG. 30 shows a cross-sectional view of a lower flange of the pump body assembly in FIG. 26.
Figure 31:
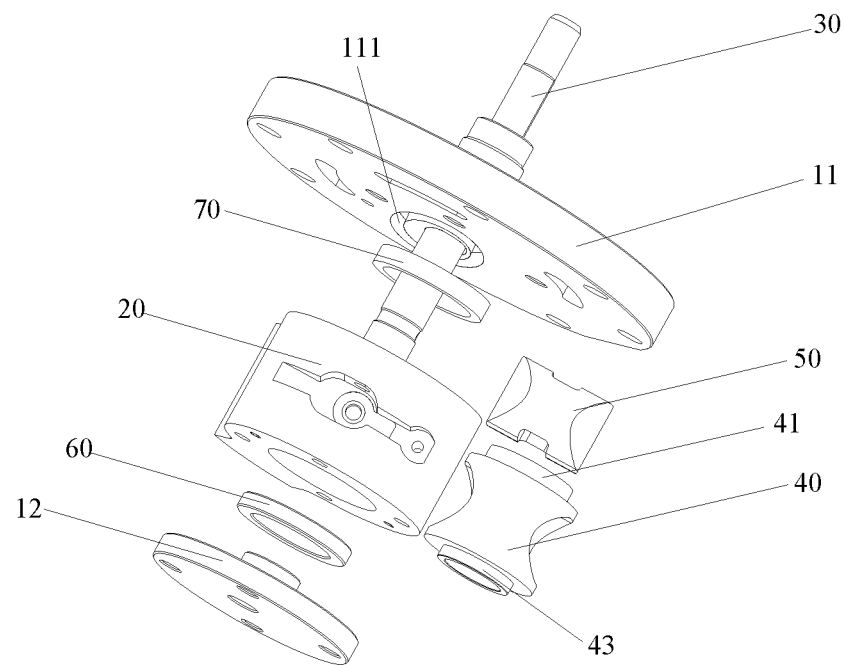
FIG. 31 shows a schematic exploded view of a pump body assembly according to an eighth embodiment of the present disclosure.

As shown in FIGS. 13-15, the pump body assembly further includes an upper flange 11 and an upper friction-reducing ring 70. The upper friction-reducing ring 70 is disposed inside the cylinder 20; the upper flange 11 is disposed above the cylinder 20. An upper end surface of the piston sleeve 40 fits and is limited by the upper friction-reducing ring 70, so as to prevent the piston sleeve 40 from moving relative to the upper flange 11 in the radial direction. In this case, during the operation of the pump body assembly, the upper end of the piston sleeve 40 is limited and supported by the upper friction-reducing ring 70, thereby preventing the piston sleeve 40 from moving in the radial direction during operation, ensuring that the piston sleeve 40 can rotate normally, solving the problem known to the inventors that the work efficiency of the pump body assembly is affected because the piston sleeve of the pump body assembly is prone to rotate eccentrically, and improving the operation reliability and the work performance of the pump body assembly.

As shown in FIGS. 13 and 14, the first extended part 41 is provided on the upper end surface of the piston sleeve 40. The first extended part 41 extends into a central hole of the upper friction-reducing ring 70, fits and is limited by an inner surface of the central hole of the upper friction-reducing ring 70. Specifically, during the operation of the pump body assembly, the first extended part 41 extends into the central hole of the upper friction-reducing ring 70, fits and is limited by the inner surface of the central hole, thus limiting the upper end of the piston sleeve 40 in the radial direction, preventing the upper end of the piston sleeve 40 from moving relative to the upper flange 11 in the radial direction, and avoiding structural interference between the piston sleeve 40 and the piston 50 or cylinder 20, which will affect the normal operation of the pump body assembly. The above-mentioned structure is simple, and easy to process and implement.

In this embodiment, the first extended part 41 is ring-shaped, and the first extended part 41 and the piston sleeve 40 are coaxially arranged. In this case, the above arrangement enables the piston sleeve 40 to rotate relative to the upper flange 11, thereby ensuring the operation reliability of the pump body assembly. The piston sleeve 40 and the upper flange 11 are eccentrically arranged, and the eccentricity therebetween is the eccentricity e of the pump body assembly. In this case, the above arrangement enables the first extended part 41 of the piston sleeve 40 to rotate inside a central hole of the upper position-limiting plate 14 and rotate around the center axis of the piston sleeve 40, thus ensuring reliability of the position limitation and the support provided by the upper position-limiting plate 14 for the piston sleeve 40.

It should be noted that a structure of the first extended part 41 is not limited to such. Optionally, the first extended part 41 is a double-layered ring-shaped structure, and an outermost layer ring-shaped structure is limited and stopped by the inner surface of the central hole of the upper position-limiting plate 14. In this case, the above arrangement makes the structure of the first extended part 41 more diversified, thereby making the processing and manufacturing of the piston sleeve 40 easier and simpler, and reducing the labor intensity of staff.

Optionally, the first extended part 41 is a protruding ring, and the protruding ring and the piston sleeve 40 are coaxially arranged.

It should be noted that the structure of the first extended part 41 is not limited to such. Optionally, the first extended part 41 includes at least one protrusion. When multiple protrusions are included, the multiple protrusions are arranged in a circle and arranged coaxially with the piston sleeve 40.

Fifth Embodiment

The pump body assembly of the fifth embodiment differs from that of the fourth embodiment in that structure of the upper friction-reducing ring 70 and structure of the piston sleeve 40 are different respectively.

As shown in FIGS. 16 to 20, a fifth position-limiting groove 71 is disposed on a surface of the upper friction-reducing ring 70, which faces the piston sleeve 40. The first extended part 41 is provided on the upper end surface of the piston sleeve 40. The first extended part 41 extends into the fifth position-limiting groove 71, and is limited and stopped by the fifth position-limiting groove 71. The above-mentioned structure is simple, and easy to process and implement.

Specifically, during the operation of the pump body assembly, the outer surface of the first extended part 41 of the piston sleeve 40 is limited and stopped by a groove wall of the fifth position-limiting groove 71, thereby realizing, by the upper friction-reducing ring 70, the position limitation and a stop to the upper end of the piston sleeve 40, preventing the upper end of the piston sleeve 40 from moving relative to the upper flange 11 in the radial direction, and improving the operation reliability of the pump body assembly.

Optionally, the fifth position-limiting groove 71 is a ring-shaped groove. The ring-shaped groove and the central hole of the upper friction-reducing ring 70 are coaxially arranged.

Optionally, the first extended part 41 is ring-shaped. The fifth position-limiting groove 71 and the first extended part 41 are coaxially arranged.

Sixth Embodiment

The pump body assembly of the sixth embodiment differs from that of the fourth embodiment in that the structure of the upper friction-reducing ring 70 is different.

As shown in FIGS. 21-25, a fourth extended part 72 is disposed on the surface of the upper friction-reducing ring 70, which faces the piston sleeve 40. The fourth extended part 72 extends into the piston sleeve 40, limits and stops the inner surface of the piston sleeve 40. Specifically, a step surface 44 is disposed on the inner surface of the piston sleeve 40, and the fourth extended part 72 extends into and limits the step surface 44, thus realizing, by the upper friction-reducing ring 70, the position limitation to the piston sleeve 40 in the radial direction.

Optionally, the fourth extended part 72 is ring-shaped, and the fourth extended part 72 and the central hole of the upper friction-reducing ring 70 are coaxially arranged.

It should be noted that a structure of the fourth extended part 72 is not limited to such. Optionally, the fourth extended part 72 is a double-layered ring-shaped structure, and an outermost layer ring-shaped structure limits and stops the inner surface of the step surface 44. In this case, the above arrangement makes the structure of the fourth extended part 72 more diversified, thereby making the processing and the manufacturing of the upper friction-reducing ring 70 easier and simpler, and reducing the labor intensity of staff.

Seventh Embodiment

The pump body assembly of the seventh embodiment differs from that of the fourth embodiment in that the structure of the upper friction-reducing ring 70 and the structure of the piston sleeve 40 are different respectively.

As shown in FIGS. 26 to 30, the fourth extended part 72 is disposed on the surface of the upper friction-reducing ring 70, which faces the piston sleeve 40, and a first position-limiting groove 42 is disposed on the upper end surface of the piston sleeve 40. The fourth extended part 72 extends into the first position-limiting groove 42, limits and stops the first position-limiting groove 42.

Specifically, during the operation of the pump body assembly, the fourth extended part 72 extends into the first position-limiting groove 42, and an outer surface of the fourth extended part 72 limits and stops the groove wall of the first position-limiting groove 42, thus realizing, by the upper friction-reducing ring 70, the position limitation to the piston sleeve 40 in the radial direction.

In this embodiment, the fourth extended part 72 and the first position-limiting groove 42 are ring-shaped, and the fourth extended part 72, the first position-limiting groove 42 and the piston sleeve 40 are coaxially arranged. The above-mentioned structure is simple, and easy to implement and process.

Eighth Embodiment

The pump body assembly of the eighth embodiment differs from that of the fourth embodiment in that a structure of the upper flange 11 is different.

As shown in FIGS. 31 to 34, the pump body assembly further includes the upper flange 11 and the upper friction-reducing ring 70; the upper friction-reducing ring 70 is disposed inside the cylinder 20; the upper flange 11 is disposed above the cylinder 20; the upper friction-reducing ring 70 has a central hole; and the first extended part 41 is disposed on the upper end surface of the piston sleeve 40. The first extended part 41 extends into the central hole of the upper friction-reducing ring 70, fits and is limited by the lower end surface of the upper flange 11, so as to prevent the piston sleeve 40 from moving relative to the upper flange 11 in the radial direction. Specifically, during the operation of the pump body assembly, the first extended part 41 of the piston sleeve 40 extends into the central hole of the upper friction-reducing ring 70, fits and is limited by the lower end surface of the upper flange 11, thus realizing, by the upper flange 11, the position limitation to and the support for the upper end of the piston sleeve 40, further preventing the piston sleeve 40 from moving in the radial direction during operation, ensuring that the piston sleeve 40 can rotate normally, solving the problem known to the inventors that the work efficiency of the pump body assembly is affected because the piston sleeve of the pump body assembly is prone to rotate eccentrically, and improving the operation reliability and the work performance of the pump body assembly.

Figure 32:
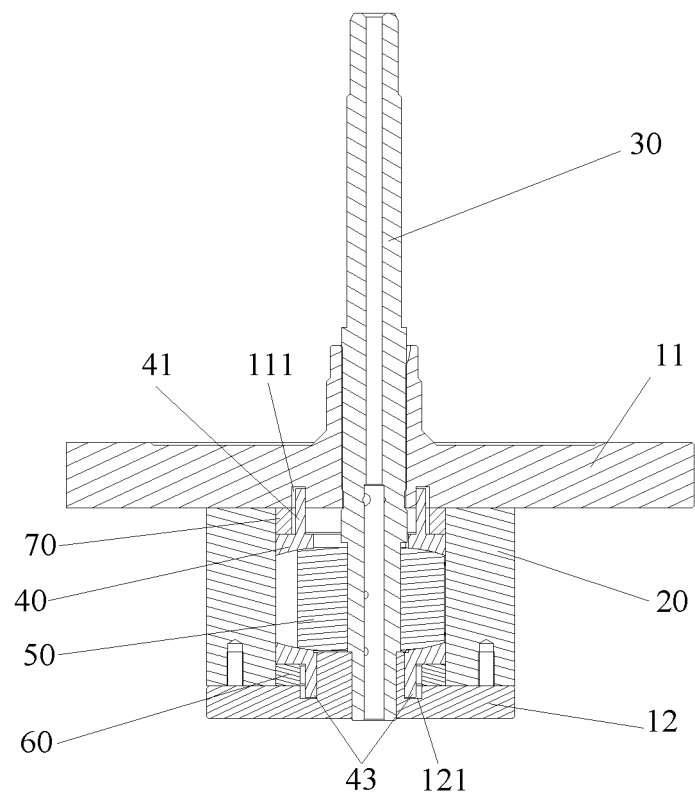
FIG. 32 shows a cross-sectional view of the pump body assembly in FIG. 31.
Figure 33:
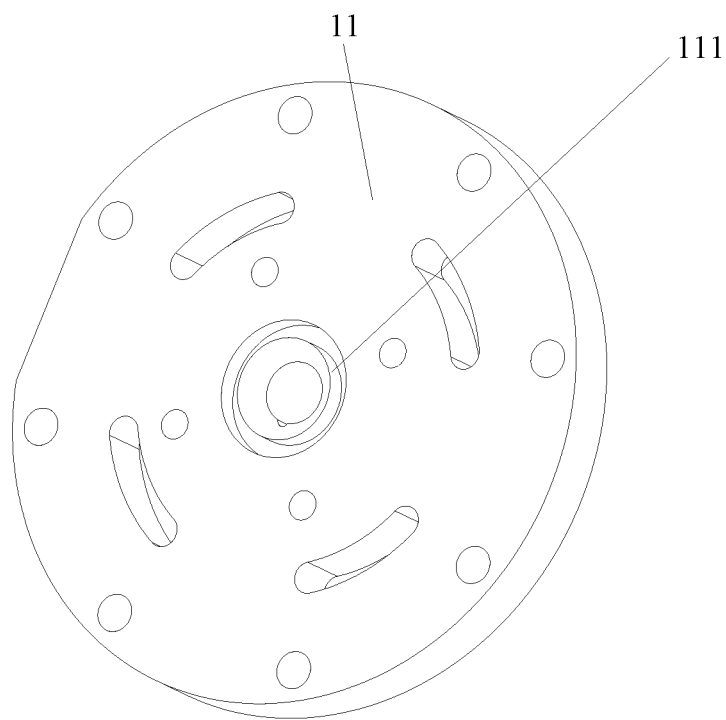
FIG. 33 shows a perspective view of an upper flange of the pump body assembly in FIG. 31.
Figure 34:
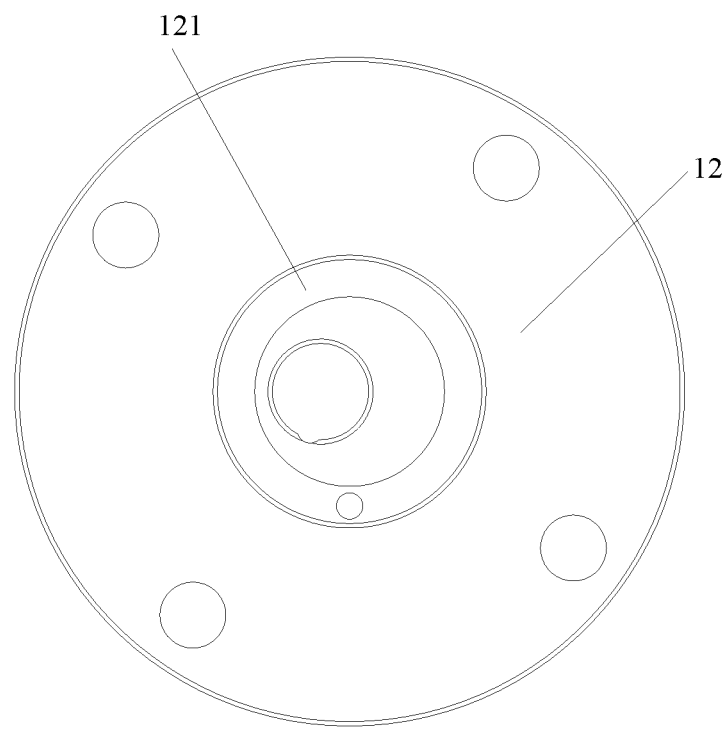
FIG. 34 shows a top view of a lower flange of the pump body assembly in FIG. 31.

As shown in FIGS. 32 and 33, the concave part 111 is disposed on the surface of the upper flange 11, which faces the piston sleeve 40. The first extended part 41 extends into the concave part 111, and is limited and stopped by the convex part 111 in the radial direction of the piston sleeve 40. Specifically, the first extended part 41 passes through the central hole of the upper friction-reducing ring 70, and then extends into the concave part 111. The outer surface of the first extended part 41 fits and is limited by the inner surface of the concave part 111, thus realizing, by the upper flange 11, the position limitation and the stop to the upper end of the piston sleeve 40 in the radial direction, and avoiding the structural interference between the piston sleeve 40 and the piston 50 or the cylinder 20, which will affect the normal operation of the pump body assembly. The above-mentioned structure is simple, and easy to process and implement.

In this embodiment, the first extended part 41 and the concave part 111 are ring-shaped, and the first extended part 41, the concave part 111 and the piston sleeve 40 are coaxially arranged. In this case, the above arrangement enables the piston sleeve 40 to rotate relative to the upper flange 11, thereby ensuring the operation reliability of the pump body assembly. The piston sleeve 40 and the upper flange 11 are eccentrically arranged, and the eccentricity thereof is the eccentricity e of the pump body assembly. In this case, the above arrangement enables the first extended part 41 of the piston sleeve 40 to rotate in the concave part 111 of the upper flange 11 and rotate around the center axis of the piston sleeve 40 (or around a center axis of the concave part 111), thus ensuring reliability of the position limitation and the support provided by the upper flange 11 for the piston sleeve 40.

It should be noted that a structure of the first extended part 41 is not limited to such. Optionally, the first extended part 41 is a double-layered ring-shaped structure, and at least one layer of the ring-shaped structure is limited and stopped by an inner groove wall or an outer groove wall of the concave part 111. In this case, the above arrangement makes the structure of the first extended part 41 more diversified, thereby making the processing and the manufacturing of the piston sleeve 40 easier and simpler, and reducing the labor intensity of staff.

In this embodiment, the concave part 111 is a groove. The above-mentioned structure is simple, and easy to process and implement.

In this embodiment, a width of the groove is greater than a thickness of the first extended part 41. In this case, the above arrangement ensures that the first extended part 41 is located in the groove, thereby ensuring that the groove can limit and stop the first extended part 41, improving the reliability of the position limitation provided by the upper flange 11 for the piston sleeve 40, and improving the operation reliability of the pump body assembly.

In other embodiments not shown in the drawings, the lower end surface of the upper flange has a position-limiting portion extending towards the piston sleeve, and the first extended part is limited and stopped by the position-limiting portion, so as to prevent the piston sleeve from moving relative to the upper flange in the radial direction.

From the above description, it can be seen that the above-mentioned embodiments of the present disclosure achieves following technical effects:

During the operation of the pump body assembly, the position-limiting protrusion disposed at the lower end of the piston sleeve passes through the central hole of the lower friction-reducing ring, fits and is limited by the lower flange, thus the lower end of the piston sleeve is limited and supported by the lower flange, thereby preventing the piston sleeve from moving in the radial direction during operation, ensuring that the piston sleeve can rotate normally, solving the problem known to the inventors that the work efficiency of the pump body assembly is affected because the piston sleeve of the pump body assembly is prone to rotate eccentrically, and improving the operation reliability and the work performance of the pump body assembly.

Apparently, the embodiments described above are merely part of the embodiments of the present disclosure, rather than all the embodiments. Based on the embodiments of the present disclosure, all other embodiments obtained by those skilled in the art without creative efforts shall fall within the protection scope of the present disclosure.

It should be noted that terms used herein are only for the purpose of describing specific embodiments and not intended to limit the exemplary embodiments of the disclosure. The singular of a term used herein is intended to include the plural of the term unless the context otherwise specifies. In addition, it should also be appreciated that when terms "include" and/or "comprise" are used in the description, they indicate the presence of features, steps, operations, devices, components and/or their combination.

It should be noted that the terms "first", "second", and the like in the description, claims and drawings of the present disclosure are used to distinguish similar objects, and are not necessarily used to describe a specific order or time order. It should be appreciated that such terms can be interchangeable if appropriate, so that the embodiments of the disclosure described herein can be implemented, for example, in an order other than those illustrated or described herein.

The above descriptions are merely some embodiments of the present disclosure, and are not intended to limit the present disclosure. For those skilled in the art, various modifications and changes can be made for the present disclosure. Any modifications, equivalent substitutions, improvements, etc., made within the spirits and the principles of the present disclosure are included within the scope of the present disclosure.

What is claimed is:

1. A pump body assembly, comprising:
   a lower flange;
   a lower friction-reducing ring;
   a cylinder, the lower friction-reducing ring being disposed inside the cylinder, and the lower flange being disposed below the cylinder; and
   a piston assembly arranged inside the cylinder, and comprising a piston sleeve and a piston slidably arranged inside the piston sleeve;
   wherein the lower friction-reducing ring has a central hole; a position-limiting protrusion is disposed on a surface of the piston sleeve, and the surface of the piston sleeve faces the lower flange; and the position-limiting protrusion extends into the central hole of the lower friction-reducing ring, fits and is limited by the lower flange, to prevent the piston sleeve from moving in a radial direction relative to the lower flange.

2. The pump body assembly according to claim 1, wherein a second position-limiting groove is disposed on a surface of the lower flange, and the surface of the lower flange faces the piston sleeve; and the position-limiting protrusion extends into the second position-limiting groove, to prevent the piston sleeve from moving relative to the lower flange in the radial direction.

3. The pump body assembly according to claim 1, wherein a second extended part is provided on a surface of the lower flange, and the surface of the lower flange faces the piston sleeve; and the second extended part limits and stops the position-limiting protrusion, to prevent the piston sleeve from moving relative to the lower flange in the radial direction.

4. The pump body assembly of claim 3, wherein the second extended part is disposed outside the position-limiting protrusion.

5. The pump body assembly according to claim 3, wherein the second extended part is disposed inside the position-limiting protrusion.

6. The pump body assembly according to claim 1, wherein the position-limiting protrusion is a protruding ring extending towards the lower flange, and the protruding ring and the piston sleeve are coaxially arranged.

7. The pump body assembly according to claim 1, wherein the position-limiting protrusion comprises a plurality of protruding platforms extending towards the lower flange, and the plurality of the protruding platforms are arranged at intervals along a circumference of the piston sleeve.

8. The pump body assembly according to claim 1, wherein the pump body assembly further comprises an upper flange and an upper friction-reducing ring; the upper friction-reducing ring is disposed inside the cylinder; the upper flange is disposed above the cylinder; and an upper end surface of the piston sleeve fits and is limited by the upper friction-reducing ring, to prevent the piston sleeve from moving relative to the upper flange in the radial direction.

9. The pump body assembly according to claim 8, wherein a first extended part is provided on the upper end surface of the piston sleeve, and the first extended part extends into a central hole of the upper friction-reducing ring, fits and is limited by an inner surface of the central hole of the upper friction-reducing ring.

10. The pump body assembly according to claim 8, wherein a fifth position-limiting groove is disposed on a surface of the upper friction-reducing ring, and the surface of the upper friction-reducing ring faces the piston sleeve; a first extended part is provided on the upper end surface of the piston sleeve; and the first extended part extends into the fifth position-limiting groove, and is limited and stopped by the fifth position-limiting groove.

11. The pump body assembly according to claim 8, wherein a fourth extended part is disposed on a surface of the upper friction-reducing ring, and the surface of the upper friction-reducing ring faces the piston sleeve; the fourth extended part extends into the piston sleeve, limits and stops an inner surface of the piston sleeve.

12. The pump body assembly according to claim 8, wherein a fourth extended part is disposed on a surface of the upper friction-reducing ring, and the surface of the upper friction-reducing ring faces the piston sleeve; the fourth extended part extends into a first position-limiting groove disposed on the upper end surface of the piston sleeve, limits and stops the first position-limiting groove.

13. The pump body assembly according to claim 1, wherein the pump body assembly further comprises an upper flange and an upper friction-reducing ring; the upper friction-reducing ring is disposed inside the cylinder; the upper flange is disposed above the cylinder; the upper friction-reducing ring has a central hole; a first extended part is disposed on an upper end surface of the piston sleeve; and the first extended part extends into the central hole of the upper friction-reducing ring, fits and is limited by a lower end surface of the upper flange, to prevent the piston sleeve from moving relative to the upper flange in the radial direction.

14. The pump body assembly according to claim 13, wherein the lower end surface of the upper flange has a position-limiting portion extending towards the piston sleeve; the first extended part is limited and stopped by the position-limiting portion, to prevent the piston sleeve from moving relative to the upper flange in the radial direction.

15. The pump body assembly according to claim 13, wherein a concave part is disposed on a surface of the upper flange, and the surface of the upper flange faces the piston sleeve; the first extended part extends into the concave part, and is limited and stopped by the convex part in the radial direction of the piston sleeve.

16. The pump body assembly according to claim 15, wherein the first extended part and the concave part are ring-shaped, and the first extended part, the concave part, and the piston sleeve are coaxially arranged.

17. The pump body assembly according to claim 15, wherein the first extended part is a double-layered ring-shaped structure, and at least one layer of the ring-shaped structure is limited and stopped by an inner groove wall or an outer groove wall of the concave part.

18. The pump body assembly according to claim 1, wherein the pump body assembly further comprises an upper flange disposed above the piston assembly, and a rotation shaft;
 the rotation shaft is provided, and passes through the upper flange, the piston sleeve, and the lower flange in sequence; and the rotation shaft, the upper flange, and the lower flange are coaxially arranged.

19. Fluid machinery, comprising the pump body assembly of claim 1.

20. A heat exchange device, comprising the fluid machinery of claim 19.

* * * * *